US006692133B2

United States Patent
Katsu et al.

(10) Patent No.: US 6,692,133 B2
(45) Date of Patent: Feb. 17, 2004

(54) PLANE LIGHT SOURCE APPARATUS, LIGHT GUIDE PLATE AND DISPLAY

(75) Inventors: Yoshihiro Katsu, Kanagawa-ken (JP); Masaki Ohshima, Kanagawa-ken (JP); Masaru Suzuki, Kanagawa-ken (JP); Yoji Oki, Tokyo (JP); Yasuyuki Daigo, Tokyo (JP)

(73) Assignees: International Business Machines Corporation, Armonk, NY (US); Stanley Electric Co., Ltd., Tokyo (JP)

( * ) Notice: Subject to any disclaimer, the term of this patent is extended or adjusted under 35 U.S.C. 154(b) by 0 days.

(21) Appl. No.: 09/911,988

(22) Filed: Jul. 24, 2001

(65) Prior Publication Data

US 2002/0015300 A1 Feb. 7, 2002

(30) Foreign Application Priority Data

Jul. 25, 2000 (JP) ........................................ 2000-223484

(51) Int. Cl.[7] .................................................. F21V 7/04
(52) U.S. Cl. ............................. 362/31; 362/26; 362/27; 362/285; 362/146; 349/64
(58) Field of Search ............................. 362/26, 27, 31, 362/285, 146; 349/64

(56) References Cited

U.S. PATENT DOCUMENTS

| 5,863,114 | A | * | 1/1999 | Nagatani et al. | ............ 362/328 |
| 5,890,791 | A | * | 4/1999 | Saito | ............................. 362/31 |
| 6,027,222 | A | * | 2/2000 | Oki et al. | ...................... 362/31 |
| 6,088,074 | A | * | 7/2000 | Suzuki | ........................ 349/62 |
| 6,092,904 | A | * | 7/2000 | Tai et al. | ........................ 362/31 |
| 6,305,811 | B1 | * | 10/2001 | Beeson et al. | ................. 362/31 |

FOREIGN PATENT DOCUMENTS

| JP | 7-20466 | 1/1995 |
| JP | 7-301713 | 11/1995 |
| JP | 8-254616 | 10/1996 |

* cited by examiner

Primary Examiner—Sandra O'Shea
Assistant Examiner—Jacob Y. Choi
(74) Attorney, Agent, or Firm—Weingarten, Schurgin, Gagnebin & Lebovici LLP

(57) ABSTRACT

A plane light source apparatus having a lamp as light source and a light guide plate for directing and emitting the light from the lamp, wherein said light guide has a light incident surface opposed to said lamp and where the light from the lamp enters, a light emitting surface for emitting light from the lamp, and an opposed surface opposed to the light emitting surface, said light emitting surface or said opposed surface extends in the direction opposed to said light incident surface, has a plurality of convexoconcave portions formed to collect substantially light propagating in said light guide plate, and said convexoconcave portions have a flat face formed at the bottom of the concave portion or at the top face of the convex portion.

22 Claims, 8 Drawing Sheets

| | 1 | 2 | 3 | 4 | 5 | 6 | 7 | 8 | 9 | |
|---|---|---|---|---|---|---|---|---|---|---|
| | 40 | 41 | 38 | 42 | 42 | 39 | 41 | 41 | 39 | I |
| | 35 | 37 | 42 | 39 | 41 | 41 | 41 | 39 | 36 | H |
| H1→ | 35 | 37 | 41 | 43 | 44 | 44 | 42 | 40 | 37 | G |
| | 37 | 36 | 41 | 44 | 44 | 45 | 42 | 40 | 35 | F |
| | 38 | 40 | 43 | 43 | 45 | 45 | 43 | 38 | 38 | E |
| | 37 | 39 | 41 | 45 | 46 | 44 | 45 | 40 | 38 | D |
| | 36 | 38 | 39 | 44 | 42 | 45 | 43 | 35 | 38 | C |
| | 35 | 36 | 40 | 41 | 41 | 41 | 41 | 38 | 38 | B |
| | 40 | 37 | 37 | 38 | 39 | 39 | 39 | 36 | 41 | A |

(B)

| | 1 | 2 | 3 | 4 | 5 | 6 | 7 | 8 | 9 | |
|---|---|---|---|---|---|---|---|---|---|---|
| | 43 | 40 | 43 | 42 | 41 | 43 | 38 | 41 | 43 | I |
| | 34 | 40 | 41 | 43 | 46 | 45 | 42 | 39 | 32 | H |
| H2→ | 34 | 38 | 43 | 45 | 42 | 43 | 42 | 40 | 32 | G |
| | 31 | 39 | 42 | 44 | 45 | 46 | 43 | 38 | 33 | F |
| | 32 | 41 | 39 | 41 | 41 | 40 | 44 | 39 | 33 | E |
| | 29 | 39 | 44 | 43 | 42 | 44 | 43 | 39 | 32 | D |
| | 29 | 40 | 43 | 43 | 43 | 42 | 43 | 42 | 30 | C |
| | 32 | 43 | 41 | 41 | 41 | 42 | 43 | 38 | 30 | B |
| | 40 | 37 | 35 | 37 | 38 | 39 | 38 | 36 | 32 | A |

PLANE LIGHT SOURCE APPARATUS, LIGHT GUIDE PLATE AND DISPLAY

BACKGROUND OF THE INVENTION

1. Field of the Invention

The present invention concerns a plane light source apparatus, a light guide plate and a display and more particularly a plane light source apparatus, a light guide plate and a display having a plurality of convexoconcave portions extending in the direction opposed to the light incident surface on a light emitting surface or on a surface opposed to the same of the light guide plate.

2. Detailed Description of the Prior Art

It is FIG. 8 and FIG. 9 that show an outline composition of a conventional plane light source. First, the plane light source 80 shown in FIG. 8 has a light source 81 substantially linear light source such as cold cathode fluorescent lamp, a light guide plate 82 made into plate-shape with transparence member such as acrylic resin, and a plurality of prism sheets 83 including fine ridge form prism structures 83a disposed closely, and formed into a sheet. A liquid crystal display panel 85 disposed in front of the plane light source 80 displays the image by controlling the penetration of the light emitted from the plane light source apparatus 80.

The cold cathode fluorescent lamp 81 is disposed in the plate thickness face of the light guide plate 82 and introduces the light inside this light guide plate 82. At this moment, a dot pattern 86 made of white paint printing or shallow round convexoconcave pattern is formed at the back of the light guide plate 82. The dot pattern 86 is disposed less dense in the vicinity of the cold cathode fluorescent lamp 81 and more dense the more distant from the cold cathode fluorescent lamp 81. This makes the brightness of the light emitted from a light emitting surface 87 approximately even.

Moreover, for instance, two of prism sheets 83 cover the light emitting surface 87 substantially orthogonal to the prism cut 83a, affording a convenient directivity to the diffused state light by the dot pattern 86, making the illumination brighter and improving further the light evenness.

Here, in recent years, according to the large-sizing of liquid crystal display panel 85, it is required to make the plane light source apparatus further lighter and thinner. At the same time, according to the diffusion of liquid crystal display apparatus, it is required to cut the cost all the more. The plane light source apparatus 90 shown in FIG. 9 is devised to meets these requirements.

And, in this conventional plane light source apparatus 90, which is including a liquid crystal display panel 95, a prism portion 97a wherein ridges similar to a prism structure portion 93a of a prism sheet 93 are provided in close contact is disposed on a light emitting surface 97 of a light guide plate 92, substantially orthogonal to the place where a light source is disposed. This intends to reduce the number of prism sheets 93 to be used.

Note that the plane light source apparatus using a light guide plate having a prism structure parallel to the linear light source is described, for example, in Japan Patent publication Hei 7-20466, or, Japan Patent publication Hei 8-254616. Also, the plane light source apparatus using a light guide plate having a prism structure extending in the direction vertical to the linear light source is described, for example, in Japan Patent publication Hei 7-301713. This Specification disclosed a light guide plate having a groove structure for diffused reflection of light, on a reflection surface opposed to the light emitting surface.

SUMMARY OF THE INVENTION

However, in a plane light source apparatus 90 shown in said FIG. 9, dark portions D are generated to the portions corresponding to both ends of the light source 91 as shown in FIG. 10, and this quality deterioration is notable for the plane light source apparatus 80 of the old composition. Such problem does not occur when the prism structure portion is formed in parallel to the light incident surface. Because, the prism structure portion, extending parallel to the linear light source axis, does not interfere with the light propagation to both ends. The first object of the present invention consists in providing a plane light source apparatus, a light guide plate and a display permitting to enhance the front brightness. Another object of the present invention consists in providing a plane light source apparatus, a light guide plate and a display permitting to reduce the number of components. Still another object of the present invention consists in providing a plane light source apparatus, a light guide plate and a display permitting to uniform the brightness in the plane.

The light guide plate according to the present invention has convexoconcave portions on the light emitting surface or on the surface opposed to the same. This convexoconcave portion extends in the direction opposed to the light incident surface of the light guide plate. Moreover, a flat face is formed at the bottom of the concave portion or at the top face of the convex portion. By providing such flat face, the light propagation to the side face of the light guide plate can be facilitated.

The light guide plate has a light incident surface where the light from a light source is introduced, a light emitting surface for emitting light from the light source, and an opposed surface opposed to the light emitting surface, the light emitting surface and the opposed surface extend in the direction opposed to the light incident surface, have a plurality of convexoconcave portions formed to collect substantially light propagating in said light guide plate, and the convexoconcave portions have a flat face formed at the bottom of the concave portion or at the top face of the convex portion.

The flat face is typically formed substantially vertical to the light incident surface or to a surface opposed to the light incident surface. And, the convexoconcave portions are preferably formed continuously with a pitch equal or inferior to 1 mm. Or, typically, the convexoconcave portions have a flat face at the bottom of the concave portion, and the breadth of the flat face is substantially identical to the breadth of the bottom surface portion of the convex portion. Besides, the area ratio of the flat face of said light emitting surface is formed to be larger at the center of the light emitting surface than at the end portion of the light emitting surface.

Taken as plane light source apparatus, the embodiment of the present invention is a plane light source apparatus having a lamp as light source and a light guide plate for directing and emitting the light from the lamp, and the light guide has a light incident surface opposed to the lamp and where the light from the lamp enters, a light emitting surface for emitting light from the lamp, and an opposed surface opposed to the light emitting surface, the light emitting surface and the opposed surface extend in the direction opposed to the light incident surface, have a plurality of convexoconcave portions formed to collect substantially light propagating in said light guide plate, and the convexoconcave portions have a flat face formed at the bottom of the concave portion or at the top face of the convex portion.

This plane light source apparatus can, further, include a prism sheet having a prism structure portion on the plane. This prism sheet is disposed preferably so that the prism surface is opposed to the light guide plate and the prism structure section crosses the convexoconcave portions on said light guide plate. Otherwise, it is preferable that the prism surface faces the opposite side of the light guide plate, and the prism structure portion is disposed to cross crosses the convexoconcave portions on said light guide plate. It is more preferable that the prism structure portion and said convexoconcave portions have a crossing angle ($\alpha$, $\beta$) equal or superior to 45 degrees.

The plane light source apparatus, further, includes a first prism sheet and a second prism sheet having a prism structure on the surface, and the first and second prism sheets can be disposed so that the prism surface faces the opposite side of the light guide plate and the prism structure portion crosses the convexoconcave portions on the light guide plate. Preferably, the first prism sheet and the second prism sheet are disposed to cross.

The convexoconcave portions on the light guide plate are preferably provided with a flat face at all concave portions or all convex portions. Typically, the flat face is formed substantially vertical to the light incident surface or to the surface opposed to said light incident surface.

Taken as display apparatus, the embodiment of the present invention comprises a plane light source apparatus and a display panel for displaying image using the light from the linear light source apparatus, the linear light source apparatus has a light guide plate for directing and emitting the light from the light source, the light guide plate includes a light incident surface where the light from the light source enters, a light emitting surface, and an opposed surface opposed to the light emitting surface, the light emitting surface or the opposed surface includes a plurality of convexoconcave portions extending in the direction opposed to the light incident surface and formed to substantially collect the light propagating in the light guide plate, and the convexoconcave portions have a flat face formed at the bottom of the concave portion or at the top face of the convex portion. Typically, the flat face is formed substantially parallel to the display surface of said display panel. Preferably, the convexoconcave portions have a pitch smaller than the auxiliary pixel portion pitch of said display panel.

BRIEF DESCRIPTION OF THE DRAWINGS

These and other objects and advantages of the present invention will become clear from the following description with reference to the accompanying drawings, wherein:

FIGS. 6(A)–6(B) show the simulation results, in this embodiment;

DETAILED DESCRIPTION OF THE PREFERRED EMBODIMENTS

Next the present invention will be described in detail referring to the embodiments shown in drawings. Drawings are described for illustrating this embodiment and do not reflect the real dimension and shape precisely.

Figure 1:
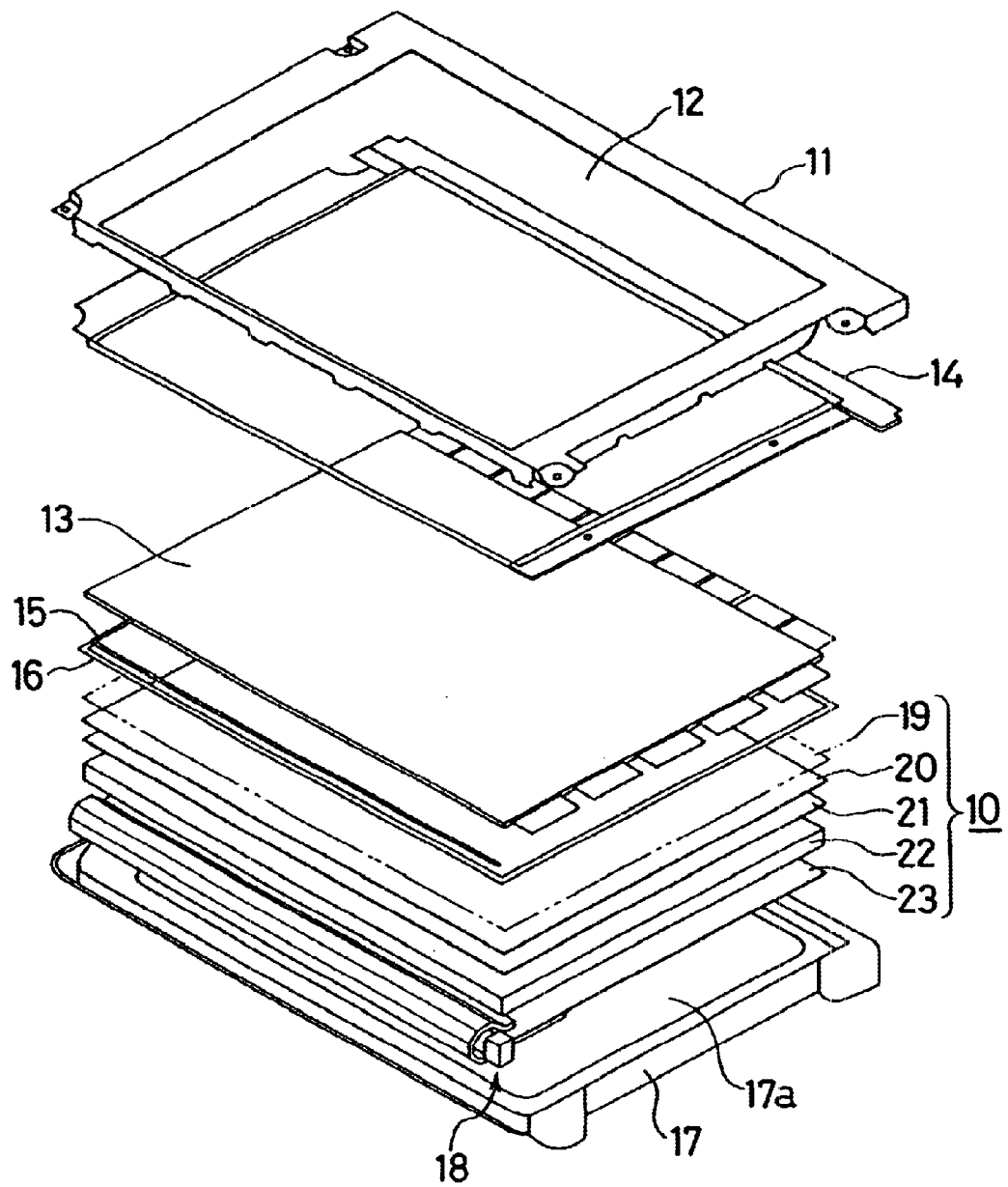
FIG. 1 is a composition drawing, showing an outline of an liquid crystal display apparatus, in this embodiment.

FIG. 1 is a composition drawing showing an outline of an liquid crystal display apparatus according to this embodiment. In the drawing, 11 represents a metal bezel for forming the upper frame, having a display window 12 for confirming the liquid crystal display effective screen. 13 is a liquid crystal display panel where a driving circuit is mounted and liquid crystal is encapsulated between two glass substrates. Auxiliary pixel portions provided with TFT as active device are formed in matrix on the glass substrate.

In the color crystal liquid display, respective auxiliary pixel portion has one color among RGB, and three auxiliary pixel portions of RGB form a single pixel portion. In the monochromic crystal liquid display, the auxiliary pixel portion is identical to the pixel portion. 14 is a insulation sheet. A light shield spacer 16 is provided under the liquid crystal display panel through a rubber cushion 15. A plane light source apparatus 10 for irradiating light to the liquid crystal display panel 13 is disposed under the liquid crystal display panel 13.

17 is a frame for storing component of the plane light source apparatus such as light guide plate, prism sheet or the like, having an opening 17a. 19 is a diffusion sheet for diffusing light and making the brightness uniform over the liquid crystal display panel, and 20, 21 are prism sheets for enhancing the display front brightness by collecting light. 22 is a light guide plate for directing and diffusing light from the light source, and 23 is a reflection sheet for reflecting the light. The diffusion sheet 19 may also be disposed under the prism sheet 21. The diffusion sheet has a function to collect light weakly to admit a convenient light into the prism sheet thereabove. The light source is not limited to a linear light source but a plurality of spherical light sources, or the like, may be used.

The plane light source 10 includes, as composition elements, a diffusion sheet 19, prism sheets 20, 21, a light guide plate, a frame 17 and a cold cathode tube 18. The cold cathode tube 18 is disposed in the curbed surface of the frame 17, ant this curbed surface acts as reflector for reflecting light from the cold cathode tube 18. The diffusion sheet may also be used between the prism sheet and the light guide plate, and it is also possible not to use any diffusion sheet at all. These are selected conveniently according to the object, characteristics or others of the plane light source apparatus.

Figure 2:
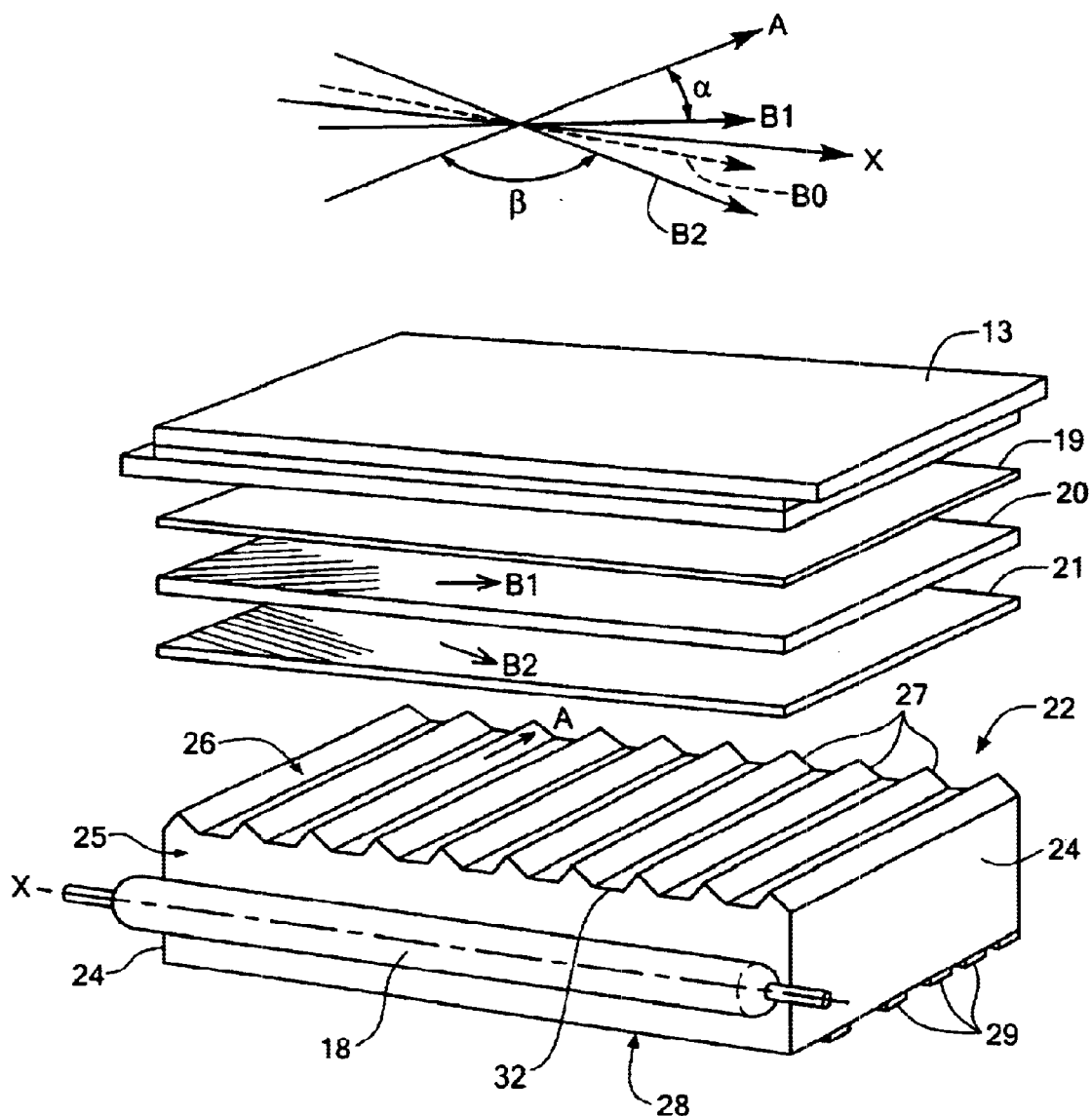
FIG. 2 is a composition drawing, showing the outline of a plane light source apparatus, in this embodiment.

FIG. 2 is a composition drawing showing the outline of a plane light source apparatus. In the drawing, those indicated by the same symbol as FIG. 1 are same portions or corresponding portions. The principle of symbol application is similar in the following. The cold cathode tube 18 is disposed on a plate thickness face 25 which is light incident surface of the light guide plate 22. The cold cathode tube 18 can be disposed on one surface, or two opposed surfaces. A side face 24 is formed adjacent to the light incident surface 25. The light guide plate thickness is about 3 mm as for 15 inches type liquid crystal display used for note PC.

26 is a light emitting surface, for emitting light from the cold cathode tube 18 to the liquid crystal panel 13. the light emitting surface 26 includes a plurality of convexoconcave portions extending in the direction opposed to the plate thickness face 25. These convexoconcave portions 27 do not necessarily extend straight forward and may be formed to meander. Also, the convexoconcave portions may be formed to vary in their cross section shape. Thus, the occurrence of moiré fringes on the display surface by disturbing the regularity of the convexoconcave portions. The detail of the cross section structure will be described below.

The back surface 28, opposed surface opposed to the light emitting surface has a dot pattern 29 formed by white paint printing, shallow round convexoconcave pattern of the like. The dot pattern 29 acts as reflection processing portion to reflect light from the cold cathode tube 18 to the light emitting surface 26. The dot pattern 26 is disposed less dense in the vicinity of the cold cathode fluorescent lamp 28 and more dense the more distant from the cold cathode fluorescent lamp 22. The dot pattern 29 may be formed on the light emitting surface 26.

A prism structure portion is formed on the top surface side of prism sheets 20, 21, and this prism surface is directed to the opposite side of the light guide plate 22. This is called, in general, upward prism. The prism structure portion has a structure arranging alternatively long extending concave portions and convex portions side by side. The cross section of concave portions and convex portions has, typically, a substantial right isosceles triangle. A number of prism sheets of different shape are known, and any prism sheet can be used.

For instance, a downward prism sheet disposed so that the prism surface is opposed to the light guide plate can be used. In addition, a arbitrary number of prism sheet can be used. For example, one can devise to use a plurality of prism sheets of low light collection function, or use only one prism sheet of high light collection function. Generally, upward prism sheets are used in two layers and downward prism sheet is used alone. The prism sheet is not required, if a sufficient front brightness is secured.

Suppose the convexoconcave portion extension direction on the light guide plate 22 be A axis. Also, suppose the prism sheet structure extension direction of the prism sheet 20, 21 be B1 axis and B2 axis respectively. The average of B1 axis and B2 axis be B0 axis. The longitudinal extension direction of the cold cathode tube 18 as linear light source be X axis. Respective axis is substantially parallel to the display surface of the liquid crystal display panel 13. Preferably, A axis is disposed to cross B1 axis and B2 axis and to have a crossing angle (α, β) equal or superior to 45 degrees respectively with B1 axis and B2 axis. The crossing angle is the smallest angle formed by two axes on the display surface.

The crossing angle of A axis and B0 axis is equal or superior to about 70 degrees, and preferable equal or superior to about 75 degrees. The convexoconcave portions on the light guide plate 22 help to collect light to the central direction of X axis. The prism sheet 20, 21 has a light collection function in the direction vertical to B1, B2 axes.

Therefore, the front surface brightness can be increased complementarily by crossing A axis with B1, B2 axes. The larger is the crossing angle, the more effective to increase the brightness; therefore, in practice, A axis is preferably orthogonal to B0 axis and has a crossing angle equal or superior to about 75 degrees.

X axis, B1 axis and B2 axis have preferably a small crossing angle respectively to suppress the moiré fringes production on the display surface. They have preferably a crossing angle of about 30 to 36 degrees, for the case of 15 inch DSXGA+. X axis has a crossing angle of about 7 to 13 degrees with B1 axis and, a crossing angle of about 18 to 26 degrees with B2 axis. It goes without saying that the crossing angle is modified conveniently according to the specifications of the liquid crystal display panel or plane light source apparatus.

Figure 3:
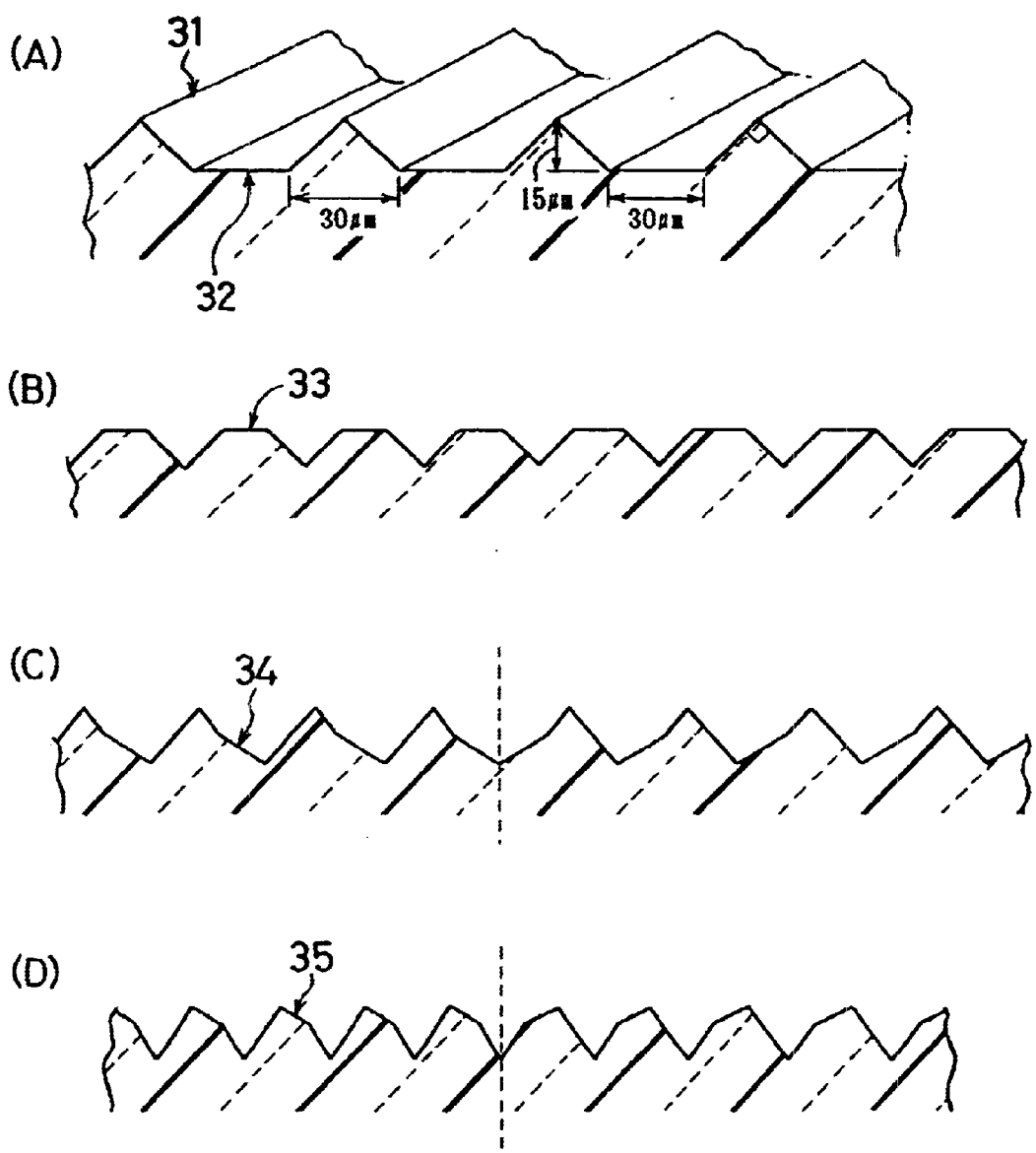
FIGS. 3(A)–3(D) are composition drawings, showing the cross section shape of a light guide plate, in this embodiment.

FIG. 3 shows an example of shape of the convexoconcave portions on the light guide plate 25. 3-A shows the cross section of the light emitting surface of the light guide plate described in FIG. 2. It includes convex portions having the shape of a substantial right triangle and concave portions between these convex portions. The concave portion has a flat face 32 at the bottom thereof, and this flat face 32 has an angle becoming substantially parallel to the display surface of the liquid crystal cell. This flat face angle is substantially vertical to the light incident surface 25 or the opposed surface thereof. The breadth of the flat face 32 is approximately 30 μm for 15 inch □SXGA+ of this embodiment.

The base section of the convex portion 31 has similarly an breadth of roughly 30 μm and the convex portion is roughly 15 μm in height. These dimensions are decided conveniently according to the specification of the liquid crystal display panel. In general, the convex portion has a pitch equal or less than about 1 mm. In addition, it is preferable that the convex portion has a pitch smaller than the auxiliary pixel portion pitch of the display panel. This it to suppress the production of moiré fringes on the display surface. 3-(B) represents a second example of the convexoconcave portions cross section. The top of the convex portion has a flat face 33. The flat face 33 is about 15 μm in breadth. The bottom of the concave portion has an angle of about 90 degrees.

3-(C) represents a third example of the convexoconcave portions cross section. The flat face 33. The flat face 34 formed at the bottom the concave portion is slant. The dotted line represents the center of the light guide plate. The slant is inclined to rise outward the light guide plate, from the center to the outside of the light guide plate. Having such inclination, light can be reflected from the slant flat face in the direction of the end of light guide plate with a large reflection angle. Therefore, it is considered that the brightness can be improved at the end. 3-(D) represents a third example of the convexoconcave portions cross section. The top of the convex portion has a flat face 35. The flat face 35 is oblique. The composition of (D) is similar to (C) except that the flat f is formed at the top of the convex portion and not at the bottom of the concave portion.

In the aforementioned respective cross section structure, the occupation area of the flat face to light emitting surface 26 is set to about 50%, the ratio is not limited to the same. This is because the brightness distribution state on the light emitting surface 26 may vary according to various conditions of the back light 10 composition, including length and width ratio and thickness of the light guide plate 22, effective length of the cold cathode tube 18 in respect to the light guide plate 22 or others. When light is propagated enough in the cold cathode tube 18 longitudinal direction, the flat face breadth may be set narrower. On the other hand, if the propagation is not enough, the brightness of the ends near the side face 24 can be increased by setting the flat face breadth larger.

Besides, in the light guide plate 22, it is also possible form so as to make the area ratio of the flat face to light emitting surface 26 higher at the light emitting surface center than at the end (vicinity of the side face 26) of the light emitting surface. For instance, the flat face breadth changes according to the place, wider at the middle portion of the light guide plate 22 and narrower at both ends. Thus, the formation of convexoconcave portions on the light emitting surface 26 and the disposition of a flat face at the bottom of concave portions or at the top of convex portions change the state of light emitted from the light emitting surface 26, for instance the brightness distribution state; therefore, it goes without saying that the disposition of the reflection processing portion 29 implemented at the back 28 of said light guide plate 22 or others are preferably optimized according to this state.

Now the optical operation of the plane light source apparatus 10 according to this embodiment will be described. Light emitted from the cold cathode tube 18 enters the light guide plate 22 through the light incident surface 25. If the index of refraction of the light guide plate 22 is 1.49, the refraction angle is equal or less than about 43 degrees, due to the difference of index of the light guide plate 22 and the air. It goes without saying that this angle varies according to the material of the light guide plate 22. Light is reflected and propagated between the back 28 and the light emitting surface 26 in the light guide plate 22, and then reflected/diffused by the dot pattern formed on the opposed surface 28. The diffused light is emitted from the light emitting surface 26, because the incident angle to the light emitting surface 26 has changed.

As for the progression of the light in a direction parallel (X axis direction) to the light incident surface 25 of the light propagating in the light guide plate 22, the light progression to the end is prevented by the convexoconcave portions formed in the light emitting surface 26. This can be considered that the propagation light in the light guide plate 22 is concentrated in the central direction at the light emitting surface 26. On the other hand, the flat face formed on the convexoconcave portions can reflect the incident light largely by the direction of the side face 24 (longitudinal direction parallel to the incident surface). Namely, it act to improve the light propagation amount in the X axis direction. This can be considered that the propagation light in the light guide plate 22 is diffused toward the side face 24 by the flat face.

Figure 4:
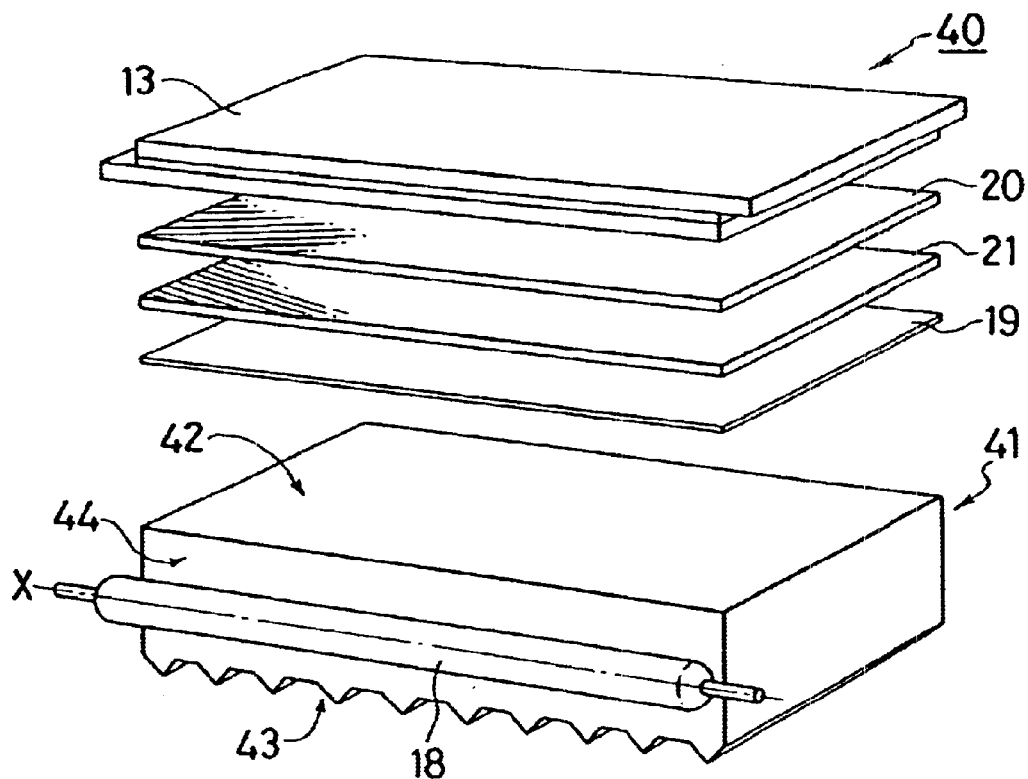
FIG. 4 is a composition drawing, showing another outline of a plane light source apparatus, in this embodiment.

FIG. 4 shows a plane light source apparatus having a light guide plate 41 different in shape from the light guide plate of FIG. 2. The light guide plate 41 has convexoconcave portions on the opposed surface 43 opposed to the light incident surface 44. The convexoconcave portions extend in the direction opposed to the light incident surface 44 and their shape is similar to the plane light source apparatus shown in FIG. 2. The other composition, such as prism sheets 20, 21 or the like is also basically similar to the one described in FIG. 2. The effect of the present invention can be expected event when the opposed surface 43 has the convexoconcave portions. The dot pattern is formed either on the opposed surface 43 or the light emitting surface 42.

Figure 5:
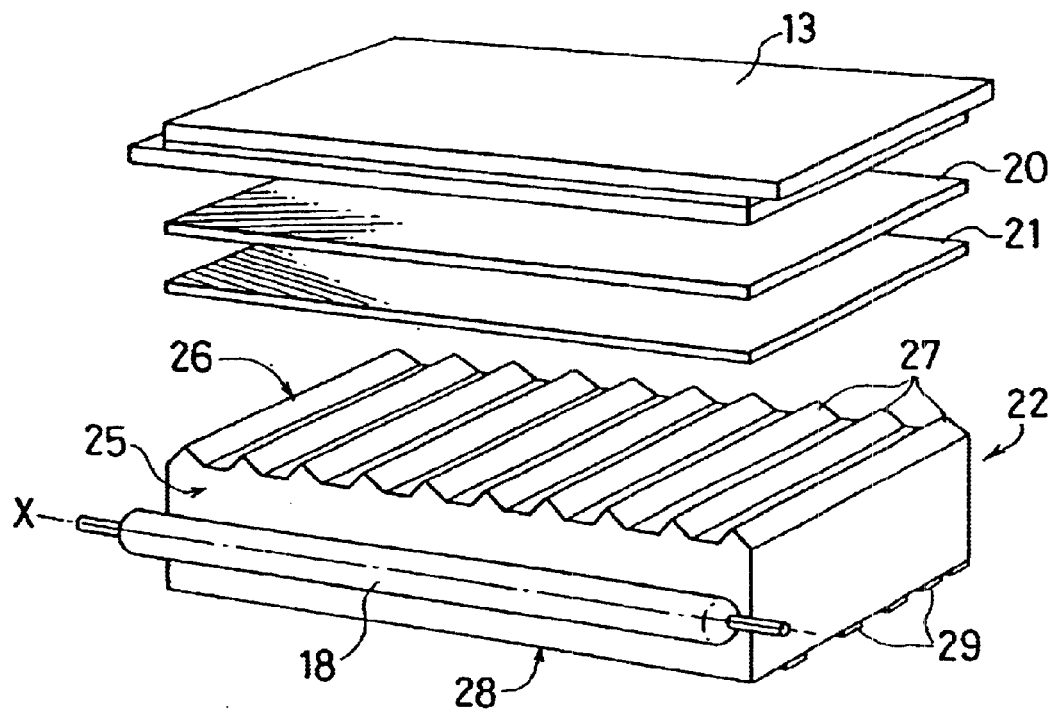
FIG. 5 is a composition drawing, showing an outline of a plane light source apparatus supposed by simulation, in this embodiment.
Figure 7:
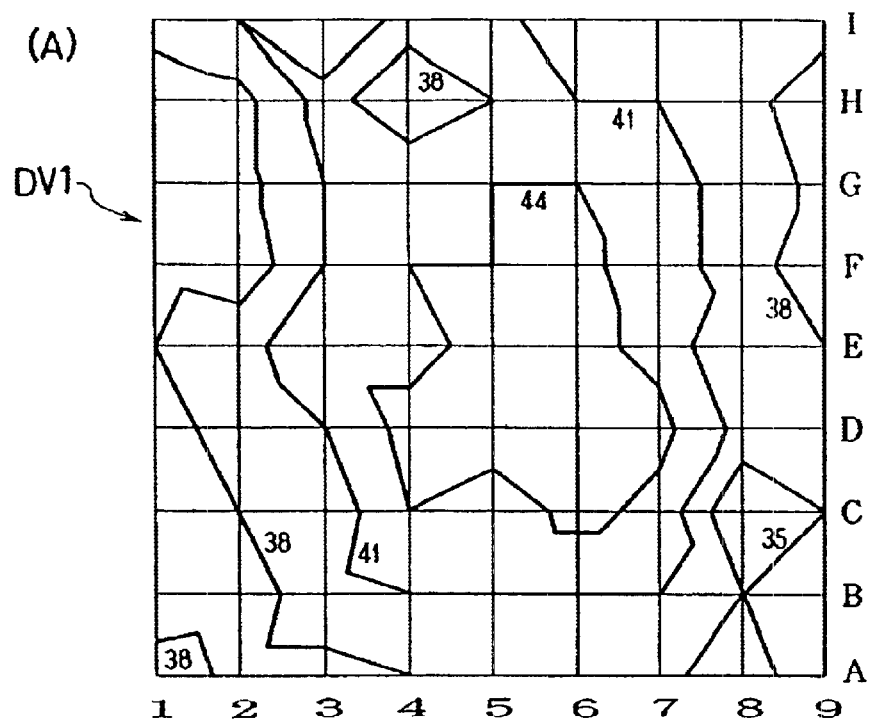
FIGS. 7(A)–7(B) show the simulation results, in this embodiment.
Figure 7:
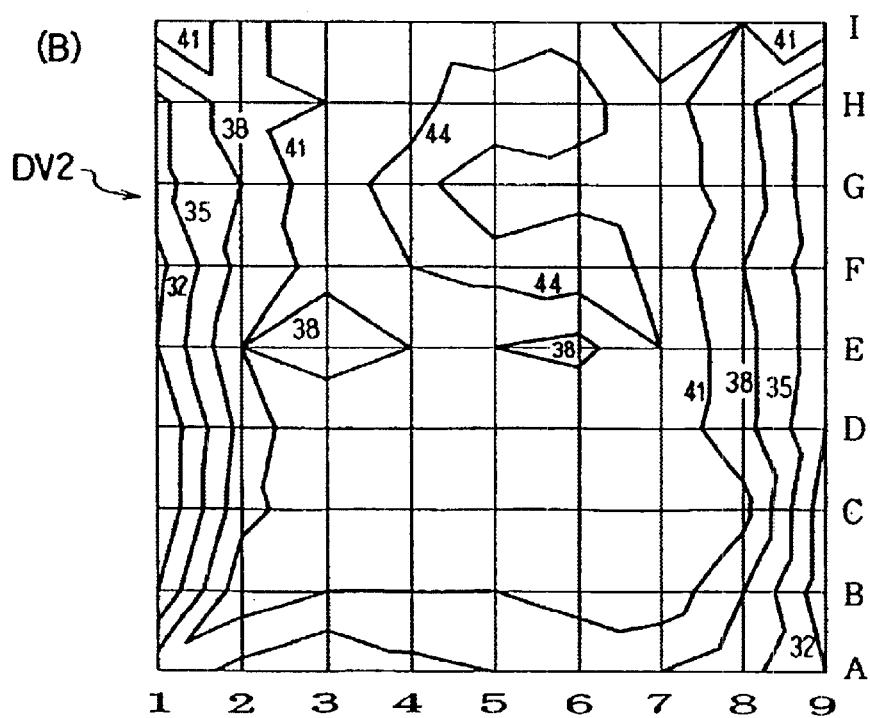
Figure 8:
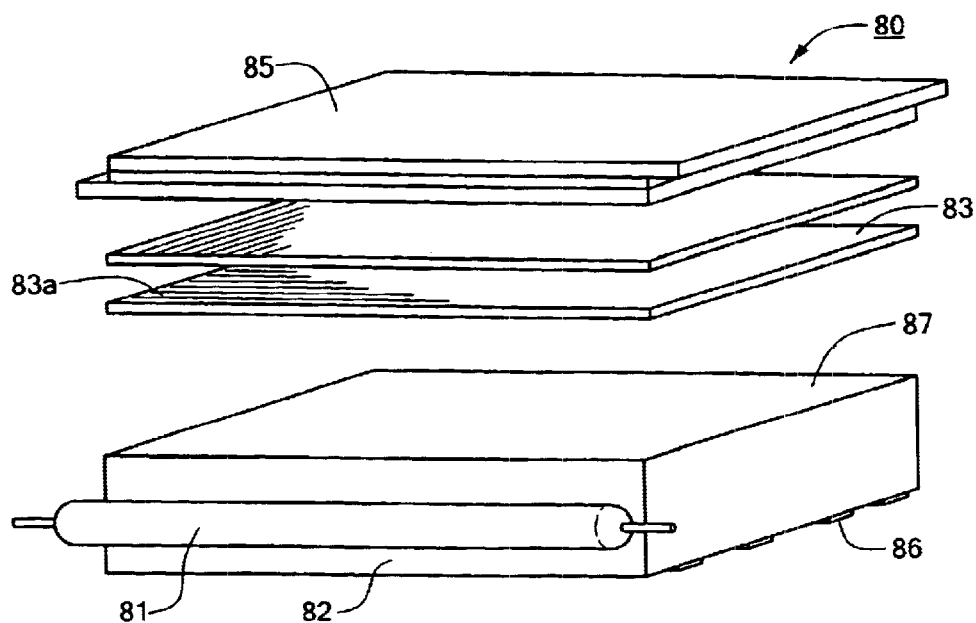
FIG. 8 is a composition drawing, showing an outline of an plane light source apparatus, in the prior art.
Figure 9:
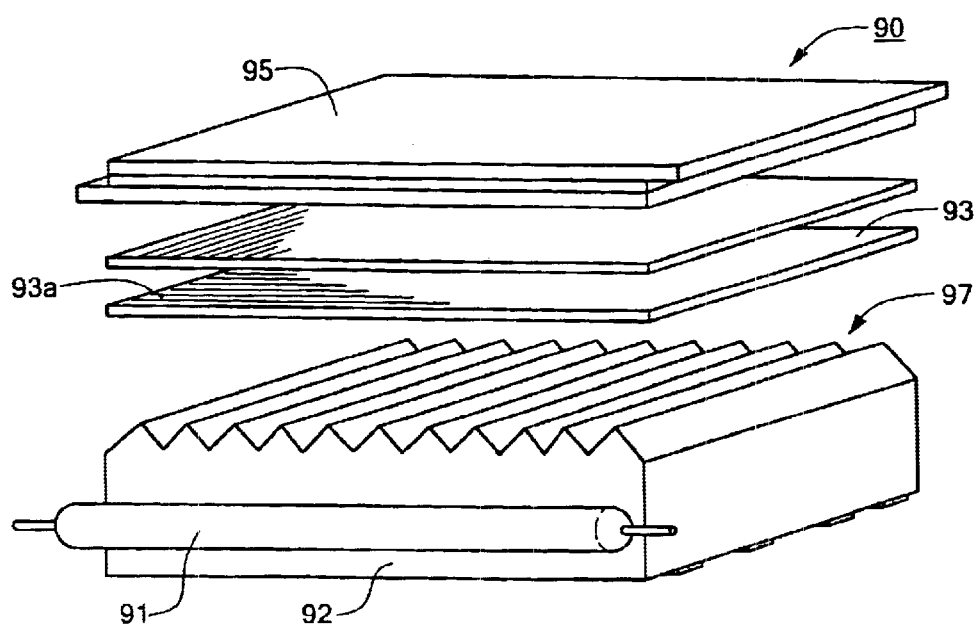
FIG. 9 is a composition drawing, showing an outline of an plane light source apparatus, in the prior art.
Figure 10:
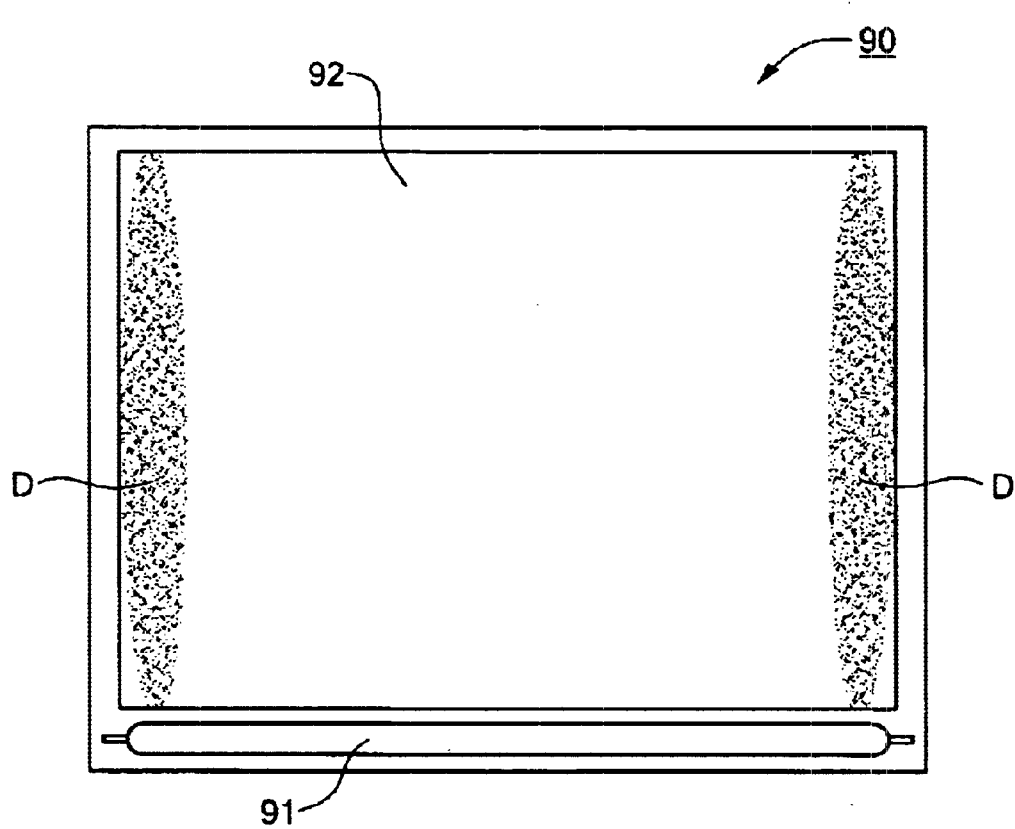
FIG. 10 shows the problem of the plane light source apparatus, in the prior art.

Now, the simulation results will be described. FIG. 5 is a composition of a plane light source apparatus supposed in this simulation. The composition elements are similar to those of the plane light source apparatus shown in FIG. 2 except that the diffusion sheet 19 is not provided. FIG. 6 and FIG. 7 show the characteristics of this plane light source apparatus in comparison with a conventional example (refer to FIG. 9) wherein prism cut is exerted to the light guide plate. FIG. 6(A) show values of brightness distribution characteristic H1 in the plane light source apparatus, while FIG. 6(B) show values of brightness distribution characteristic H2 in the conventional example. Here, the reflection processing portion disposed at the back is set to optimize the brightness diffusion in the light emitting surface.

In the embodiment of the present invention (FIG. (A)), the brightness lowest value is 35 at the points (1-B), (1$i$-G), (1$i$-H), (8$i$-C) and (9-F) and the highest value is 46 at the point (5-D). The ratio of the lowest value to the highest value is about 76%. On the other hand, in the conventional example (FIG. 6(B)), the lowest value is 29 at the points (1-C), (1$i$-D) and the highest value is 46 cd at the point (5-H) and (6-F). The ratio of the lowest value to the highest value is about 63%, and it is obvious that the composition of this embodiment is more excellent in the aspect of the performance to realize an uniformed brightness.

Also, FIG. 7 is an isolux curve graph obtained by connecting equiluminous points on the light emitting surface. FIG. 7(A) is the isolux curve DV1 of the plane light source apparatus of this embodiment, and FIG. 7(B) is the isolux curve DV2 of the conventional example. The comparison of these two isolux curve DV1 and isolux curve DV2 shows obviously that the isolux curve DV1 of the present invention is substantially concentric, and the brightness varies gradually with large interline, while the conventional example produces a sudden brightness change with narrow interline especially at both sides.

The foregoing allows to confirm that, according to the composition of this embodiment, the plane light source apparatus is effective to uniform the light emitting surface 26 brightness. Howsoever, even when the evenness is should be improved, if the light amount irradiated from the whole light emitting surface 26 reduces, the display itself would be dark, and the utility deteriorated. So the Inventor intended to confirm this point, too, has calculated the sum of the brightness from the (1-A) point to (9-I) point for the plane light source apparatus of this embodiment and the plane light source apparatus of the conventional example, and compared the brightness supposing that this value is proportional to the total light quantity of respective plane light source apparatus.

As the result, the sum of the conventional example was 3199, while the sum of the present invention is 3246. It has been confirmed that the plane light source apparatus of this embodiment has a brightness equal, or superior to that of the conventional example and has a performance that would induce no inconvenience in the practice. Here, the reason why the plane light source apparatus of this example can deploy substantially the same brightness, though the prism portion (convex portion 31) having light collection function is reduced roughly by half due to the provision of the flat face 32 will be explained. This is because, the flat face 32 improve the brightness uniformity over the light emitting surface 3c.

In the conventional example, the vicinity of i-row and ri-row lacks in brightness, so the number (area) of reflection processing portion implemented to the back of the light guide plate corresponding to ha-row to to-row near the center should be reduced compared to said i-row and ri-row. Following the reduction of number, less light from the light source attains the reflection processing portion and this light leaks outside from the plate back of the side opposed to the side where the light source is disposed. A part of this leak light reflects itself on the frame bezel and returns into the light guide plate, but it is partially emitted from the periphery of the end face portion to the display surface side. The brilliance of the light guide plate end portion stronger the other portions due to the reflection on the frame surface can be avoided by darkening the inner surface of the frame.

On the contrary, in the plane light source apparatus of this embodiment, light is propagated sufficiently to said i-row and ri-row also by the effect of the flat face. Therefore, it is useless to reduce extremely the number of reflection processing portion 29 at the back 28 of the light guide plate 22 corresponding to ha-row to to-row near the center. More light from the cold cathode tube 18 is directed to the light emitting surface 26 by the reflection processing portion 29 provided denser compared to the conventional example. It is considered, for the reasons mentioned above, the influence of the reflection by the frame surface can be reduced, and a brightness equal or superior to the conventional example can be maintained.

It goes without saying that the value, shape or others described in this embodiment can be modified, added, deformed conveniently without departing from the scope of the present invention. Also, the present invention can be applied not only to the liquid crystal display apparatus, but also to all display apparatus for displaying using light from a plane light source. Besides, the application domain of the plane light source apparatus is not limited to the plane light source apparatus of the display apparatus, but it can be used largely as light source.

While the present preferred embodiment of the present invention has been shown and described, it will be understood that the present invention is not limited thereto, and that various changes and modifications may be by those skilled in the art without departing from the scope of the invention as set forth in the appended claims.

What is claimed is:

1. A plane light source apparatus having a lamp as light source and a light guide plate for directing and emitting the light from the lamp, wherein said light guide has, a light incident surface opposed to said lamp and where the light from the lamp enters, a light emitting surface for emitting light from the lamp, and an opposed surface opposed to the light emitting surface, said light emitting surface or said opposed surface extends in the direction opposed to said light incident surface, has a plurality of convexoconcave portions having a first axis that is non-parallel to said light incident surface, said convexoconcave portions formed to collect substantially light propagating in said light guide plate, and said convexoconcave portions have a flat face formed at the bottom of the concave portion.

2. The plane light source apparatus of claim 1 comprising, further, a prism sheet having a prism structure portion on the surface, said prism structure having a prism axis, wherein said prism sheet is disposed so that said prism surface is opposed to said light guide plate and said prism structure section crosses the convexoconcave portions on said light guide plate.

3. The plane light source apparatus of claim 1, comprising, further, a prism sheet having a prism structure portion on the surface, wherein said prism structure has a prism axis and said prism sheet is disposed so that said prism surface faces the opposite side of said light guide plate and said prism structure section crosses the convexoconcave portions on said light guide plate.

4. The plane light source apparatus of claim 2, wherein said prism axis and said fist axis have a crossing angle ($\alpha$, $\beta$) equal or superior to 45 degrees.

5. The plane light source apparatus of claim 1 comprising, further, a first prism having a first prism axis and a second prism sheet having a second prism axis having a prism structure on the surface, wherein:

said first and second prism sheets are disposed so that the prism surface faces the opposite side of the light guide plate and said prism structure portion crosses the convexoconcave portions on said light guide plate, and said first and second prism sheets are disposed to have an crossing angle ($\alpha$, $\beta$) between said first prism axis and said second prism axis equal or superior to 45 degrees with said convexoconcave portions on said light guide plate.

6. The plane light source apparatus of claim 5, wherein said first prism axis and said second prism axis are disposed to cross.

7. The plane light source apparatus of claim 1, wherein all said concave portion has said flat face.

8. The plane light source apparatus of claim 1, wherein all said convex portion has said flat face.

9. The plane light source apparatus of claim 1, wherein said flat face is formed substantially vertical to said light incident surface or to said surface opposed to said light incident surface.

10. A light guide plate including a light incident surface where the light from the light source enters, a light emitting surface, and an opposed surface opposed to the light emitting surface, wherein:

said light emitting surface or said opposed surface includes a plurality of convexoconcave portions extending in the direction opposed to said light incident surface, has a plurality of convexoconcave portions having a first axis that is non-parallel to said light incident surface, said convexoconcave portions formed to substantially collect the light propagating in said light guide plate, and said convexoconcave portions have a flat face formed at the bottom of the concave portion.

11. The light guide plate of claim 10, wherein:

said flat face is formed substantially vertical to said light incident surface or said surface opposed to said light incident surface.

12. The light guide plate of claim 10, wherein:

said convexoconcave portions are formed continuously with a pitch of 1 mm or less.

13. The light guide plate of claim 10, wherein:

said flat face at the bottom of the concave portion and said concave portion both having a breadth that are substantially identical.

14. The light guide plate of claim 10, formed so that the area ratio of said flat face to said light emitting surface be higher at the center of said light emitting surface, than at the end of said light emitting surface.

15. A display apparatus, comprising a plane light source apparatus and a display panel for displaying image using the light from said linear light source apparatus, wherein said linear light source apparatus has a light guide plate for directing and emitting the light from the light source, said light guide plate includes:

a light incident surface where the light from the light source enters, a light emitting surface for emitting light from said light source, and an opposed surface opposed to said light emitting surface, said light emitting surface or said opposed surface includes a plurality of convexoconcave portions extending in the direction opposed to said light incident surface, has a plurality of convexoconcave portions having a first axis that is non-parallel to said light incident surface, said convexoconcave portions formed to substantially collect the light propagating in said light guide plate, and said convexoconcave portions have a flat face formed at the bottom of the concave portion.

16. The display apparatus of claim 15, wherein all said concave portion has said flat face.

17. The display apparatus of claim 15, wherein all said convex portion has said flat face.

18. The display apparatus of claim 15, wherein said flat face is formed substantially parallel to the display surface of said display panel.

19. The display apparatus of claim 15, wherein said convexoconcave portions have a pitch smaller than a auxiliary pixel portion pitch of said display panel.

20. The plane light source apparatus of claim 3, wherein said prism axis and said first axis have a crossing angle equal or superior to 45 degrees.

21. The plane light source apparatus of claim 7, wherein said flat face is formed substantially vertical to said light incident surface or to said surface opposed to said light incident surface.

22. The plane light source apparatus of claim 8, wherein said flat face is formed substantially vertical to said light incident surface or to said surface opposed to said light incident surface.

* * * * *

UNITED STATES PATENT AND TRADEMARK OFFICE
CERTIFICATE OF CORRECTION

PATENT NO. : 6,692,133 B2
DATED : February 17, 2004
INVENTOR(S) : Yoshihiro Katsu et al.

It is certified that error appears in the above-identified patent and that said Letters Patent is hereby corrected as shown below:

Column 6,
Line 11, "DSXGA+." should read -- □SXGA+. --.

Signed and Sealed this

Twenty-ninth Day of November, 2005

JON W. DUDAS
*Director of the United States Patent and Trademark Office*